United States Patent Office 3,418,321
Patented Dec. 24, 1968

3,418,321
RING CLOSURE METHOD FOR VAT DYES
John Edson Gordon, Bridgewater Township, Somerset County, and Isaiah Von, Plainfield, N.J., assignors to American Cyanamid Company, Stamford, Conn., a corporation of Maine
No Drawing. Continuation-in-part of application Ser. No. 399,815, Sept. 28, 1964. This application June 20, 1966, Ser. No. 558,694
7 Claims. (Cl. 260—274)

ABSTRACT OF THE DISCLOSURE

Vat dyes are prepared by the ring-closure of dye precursors, such as anthramides and substituted benzanthrones, involving heating to a temperature of 90–160° C., 1 part bp weight of the precursor in admixture with from 0.5 to 4 parts by weight of an alkali metal hydroxide and from 0.5 to 4 parts by weight of a fluxing agent boiling above about 125° C., selected from glycols and mono-lower alkyl glycol ethers, while agitating and grinding the mixture to effect attrition of the vat dye product formed therein.

---

This application is a continuation-in-part of application Ser. No. 399,815, filed Sept. 28, 1964, now abandoned.

This invention relates to, and has for its object, the provision of an improved method for preparing vat dyes by the ring closure of vat dye precursors and, more particularly, to a method for preparing vat dyes by ring closure of precursors such as anthrimides and substituted benzanthrones wherein the ring closure reaction is effected by heating the anthrimide or the benzanthrone with an alkali metal hydroxide in the presence of an organic, water-soluble hydroxylated fluxing agent boiling above about 125° C. in a reactor which simultaneously agitates and grinds the reaction mixture. The term "anthrimide" as used herein is intended to include anthraquinoylaminobenzanthrones and similar amines derived from an aminoanthraquinone and halogenated benzanthrones such as the 3-chloro, 3,9-dibromo and 3-bromobenzanthrones.

Among the well-known commercially important vat dyes are the bianthrapyrazoldiones, benzanthroneacridines (e.g., the well-known Vat Olive T and Vat Olive Green B, respectively the ring closure products of the anthrimides derived from 3,9-dibromobenzanthrone reacted with 1- aminoanthraquinone and from 3-bromobenzanthrone reacted with 1 - aminoanthraquinone) benzanthrone-anthrapyrazolones and the dibenzanthrones (e.g., dibenzanthrone). The conventional method of obtaining dyes of this type is ring closure of the starting material by a batchwise alkali fusion in the presence of methanol, ethanol or butanol at high temperature and under conditions of agitation. This method, in use for many years, was disclosed as far back as 1911 in U.S. Patent No. 995,936.

However, although this batch-fusion method for vat dyes has been used for many years, it does have definite disadvantages, especially for competitive commercial production. Such fusions are carried out batch-wise at high temperatuers. In addition, rather large amounts of alcohol and alkali agents are required, giving a reaction mixture with low viscosity. When agitation of this reaction mixture is performed in a mill, the low viscosity of the mix prevents the performance of a simultaneous grinding function.

It is an object of the present invention to improve upon the conventional way of ring closing vat dye precursors so as to avoid the requirement of large and costly amounts of reagents and enable the performance of the agitation function with reactors which simultaneously perform an attrition function.

The present invention is based on the discovery of an improved ring closure process whereby one part by weight of the vat dye precursor is heated with from about 0.5 to 4 parts of an alkali metal hydroxide at temperatures of about 90° C. to 160° C. in the presence of about 0.5 to 4 parts of an organic hydroxylated fluxing agent boiling above about 125° C., such as a water-miscible aliphatic alcohol, glycol or mono lower alkyl glycol ether, while agitating the reaction mixture in a reactor which simultaneously performs a grinding function to effect attrition of the reaction product. An example of such a reactor is the ball mill.

This new method is a definite improvement over the old method and is accompanied by important advantages. It is not to be confused with the known alcoholic caustic potash fusion ring closure process. In the new method, the hydroxylated flux is used in only very small amounts, in contrast to the large amounts of methanol and ethanol used in the old fusion method. In addition, much less KOH need be used. Thus the process of this invention can be carried out with as little as about 20% of the amount of solvent or caustic previously thought necessary for alkali fusion reactions.

An additional advantage is that the combination of reactants as indicated is suitable for reaction in a continuous reactor such as a screw type reactor. Previously, ring closures by alkali fusion could not be effected in a ball mill or a continuous reactor due to the low viscosity of the reaction mixture. According to the present invention, a much less fluid reaction mixture is obtained and it is thus feasible to use a ball mill and the like in practicing the present invention. At the start, the mixture goes through a relatively thin molten stage. It quickly thickens as conversion takes place, giving a mixture which is especially suitable for use in a ball mill type reactor.

As to the hydroxylated organic fluxing agents which are most suitable, these are generally liquid glycol or glycol monoethers miscible with water and having boiling points of at least 125° C. Examples of such agents are ethylene glycol, polypropylene glycol, polyethylene glycol, diethylene glycol, monoalkyl ethers of ethylene glycol, diethylene glycol, benzyl alcohol, cyclohexyl, etc. Compounds such as phenol and the diethyl and dibutyl ethers of ethylene glycol or diethylene glycol are not suitable for use as a fluxing agent in the process of this invention.

In carrying out the process of the invention, a reactor without a condenser is used. The reactor must be capable of handling viscous liquids and also of grinding its contents. Such a reactor is exemplified by a ball mill. Each part of the vat dye precursor is mixed with 0.5 to 4 parts of the alkaline metal hydroxide and 0.5 to 4 parts of the organic flux; the mixture is heated at 90° C. to 160° C. until the reaction is substantially complete (approximately 5 minutes to 8 hours). The product can be isolated by simply drying, thereby giving a mixture which contains excess caustic and is useful in special applications. Alternatively, the dye can be isolated by slurrying the reaction product in water and then filtering and conditioning according to known procedures.

Usually just enough of the fluxing agent to achieve a paste consistency is employed. In such amounts, only a small proportion of the reactants are dissolved.

The method is applicable to the ring closure of anthrimides and substituted benzanthrones. The reaction results in the formation of an acridine, a dibenzanthrone or an anthrapyrazole ring compound. Prominent products which may be made using this method are products of long commercial standing, viz: Vat Olive T, Vat Olive Green B and Vat Gray 2G. In the table below are examples of various compounds which may be ring closed to dyes by this new method.

miles of 1-aminoanthraquinone reacted with one mole of 3,9-dibromobenzanthrone. The contents are ground by briefly rolling the mill and the mill is then rolled and heated at 120° C. to 125° C. for 2 hours. The solid dye is isolated by dilution with water and filtration.

TABLE.—DYES AND STARTING MATERIALS

| Dyes | Starting materials (or Component Moieties) |
| --- | --- |
| Vat Olive T (C.I. 69525; C.I. Vat Black 25) | 3,9-dibromobenzanthrone, 1-aminoanthraquinone (2 moles). |
| Vay Olive Green B (C.I. 69500; C.I. Vat Green 3) | 3-bromobenzanthrone, 1-aminoanthraquinone. |
| Vat Gray 2G (U.S. Patent No. 2,456,589) | Chlorobenzanthrone, 1-aminoanthraquinone. |
| Vat Blue Gray Dye (U.S. Patent No. 3,003,962) | Chlorobenzanthrone, 1-aminoanthraquinone. |
| Vat Olive GB (C.I. 69515) | 3-bromobenzanthrone, 1,5-diaminoanthraquinone (product finally benzoylated). |
| Olive Brown GB (C.I. 69530) | 3-9-dibromobenzanthrone, 1-amino-5-benzamidoanthraquinone, 1-aminoanthraquinone. |
| Navy Blue R (C.I. 70500; C.I. Vat Blue 25) | 3-bromobenzanthrone anthrapyrazole. |
| Dibenzanthrone | 3, 3'-dibenzanthronyl. |
| Isodibenzanthrone | Dibenzanthronylsulfide. |

In the practice of the invention, the reaction mixture is agitated with concurrent grinding. For practical application, it is most convenient to carry out the reaction in a rotating type of heated reactor such as a conventional heated ball mill. However, any type of equipment capable of handling, agitating and grinding heavy reaction mixtures may be used.

The possibility of using a ball mill to carry out the new process is of special advantage and a feature of the invention. In obtaining a final product, water may be added directly to the batch in the ball mill, the dye filtered, and a saleable vat dye paste produced directly therefrom by proper milling and formulation. Further, if a powdered dry vat dye product is desired, $CO_2$ or nitrogen may be used to blow the solvent out. The remaining solid products may be isolated as a finely ground product. Any excess alkali metal hydroxide remaining may be destroyed by passing carbon dioxide into the reactor and the dye still partly in the reduced (leuco) form discharged as a dry powder from the mill.

The product from the mill may be conditioned so as to give commercial grade materials. In general, conditioning involves washing the product with water, aerating it at about 50–90° C., or, if desired, first reducing with sodium hydrosulfite and then aerating at 50–90° C.

This invention is further illustrated by the examples which follow. Therein, parts and percentages are on a weight basis unless otherwise specified.

Example 1.—Vat Olive Green B

To a ball mill are charged 45 parts potassium hydroxide, 22.6 parts of the mono-ethyl ether of diethylene glycol and 22.5 parts of the anthrimide derived from 3-bromobenzanthrone and 1-aminoanthraquinone. The reaction mixture is reacted in the rotating ball mill for 2 hours at 140° C. to 150° C. and after cooling, the contents are diluted with 50 parts of water. The mill is rolled further to produce a thin uniform slurry which is then discharged from the mill. This slurry is aerated to completely precipitate the dye. The product is filtered off, washed, conditioned and formulated into a finished dye paste or powder in the conventional manner.

Example 2.—Vat Olive T

To a ball mill are charged 22.5 parts of potassium hydroxide, 12.2 parts of the ethyl ether of diethylene glycol and 22.5 parts of the anthrimide derived from 2

Example 3

Into a ball mill are added 70 parts of potassium hydroxide, 23 parts of the mono-ethyl ether of diethylene glycol and 35 parts of the anthrimide product derived from chlorobenzanthrone and 1-aminoanthraquinone (U.S. Patent 2,456,589). The mill is operated at 140° C. to 150° C. for about 2 hours and, after cooling, 120 parts of water are added. The mill is rolled to produce a slurry which is removed from the mill and aerated to precipiate the dye completely. The latter is filtered off, washed and converted to the finished dye paste and/or powder by the usual conditioning and formulating techniques.

Example 4.—Vat Gray 2G

To the ball mill containing approximately 28 parts of the anthrimide mixture prepared from alpha-aminoanthraquinone and chlorinated benzanthrone mixture as described in the example in U.S. Patent No. 2,456,589, is added 45 parts of potassium hydroxide flakes and 15.4 parts of diethylene glycol. The mill is rolled for 2 hours at 148° C. to 158° C. and then after cooling below 100° C. a total of 200 parts of water at 70° C. is added in portions, discharging the contents of the mill between portions. The combined discharges are aerated to precipitate the dye completely. It is filtered off, washed and blended into a finished sales-type dye.

Example 5.—Dibenzanthrone

In a laboratory ball mill were placed 53.2 parts of potassium hydroxide flakes, 22.0 parts of diethylene glycol and 22.8 parts of 3,3'-dibenzanthronyl. The ball mill was heated while rotating to 155°–165° C. and held at that temperature for 3 hours. The mill was cooled to 50° C. and 100 parts of water was added. The mill was rolled for 1 hour and discharged. The mill was washed two additional times with 100 parts of water. All the mill washings were combined. Following aeration, the product was isolated by filtration and then washed with water until free of alkali. The product was formulated to a commercial salts type by known procedures. The yield was 21.4 parts of good quality dyestuff solids.

We claim:

1. In the process of preparing vat dyes by ring closure of an anthrimide or a benzanthrone vat dye precursor in the presence of an alkali metal hydroxide and a solvent, the improvement which comprises heating to a temperature of about 90–160° C. one part by weight of the vat dye precursor in admixture with from 0.5 to 4 parts by weight of an alkali metal hydroxide and from about 0.5 to 4 parts by weight of a fluxing agent boiling above about 125° C. selected from the group consisting of water-miscible glycols and mono-lower alkyl glycol ethers, while agitating and grinding the mixture to effect attrition of the vat dye product formed in said mixture.

2. The proces of claim 1 wherein the vat dye precursor is an anthrimide.

3. The process of claim 2 wherein the anthrimide is the reaction product of 3,9-dibromobenzanthrone and 1-aminoanthraquinone and the vat dye is Vat Olive T.

4. The process of claim 2 wherein the anthrimide is the reaction product of 3-bromobenzanthrone and 1-aminoanthraquinone and the vat dye is Vat Olive Green B.

5. The process of claim 1 wherein said process is carried out in the ball mill.

6. The process of claim 1 wherein the vat dye precursor is a substituted benzanthrone.

7. The process of claim 6 wherein the substituted benzanthrone is 3,3'-dibenzanthronyl.

References Cited

UNITED STATES PATENTS

| | | | |
|---|---|---|---|
| 2,872,459 | 2/1959 | Baum | 260—357 |
| 995,936 | 6/1911 | Wolff | 260—272 |
| 2,982,666 | 5/1961 | Chun et al. | 260—279 XR |
| 3,008,962 | 11/1961 | Torre | 260—274 |
| 3,027,375 | 3/1962 | Hardy et al. | 260—274 |

OTHER REFERENCES

Fierz-David: 'Fundamentals of Dye Chemistry," Interscience, 1949, pp. 14–15.

Vankataraman: "Synthetic Dyes," vol. II, Academic Press, 1952, p. 980 relied on.

NICHOLAS S. RIZZO, *Primary Examiner.*

D. DAUS, *Assistant Examiner.*

U.S. Cl. X.R.

106—288; 241—30; 260—272, 312, 358, 377, 378, 615, 635